April 14, 1964   R. F. OXLEY   3,129,364
ADJUSTABLE ROTARY CONDENSERS
Filed Feb. 20, 1961   2 Sheets-Sheet 1
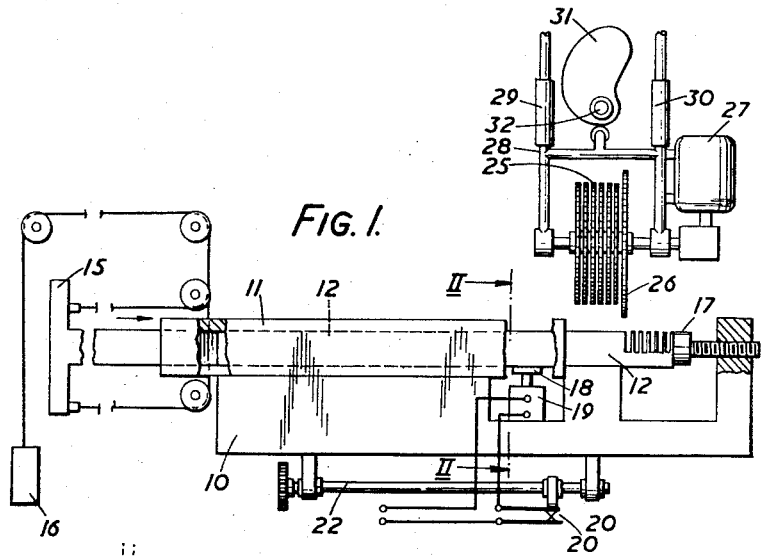
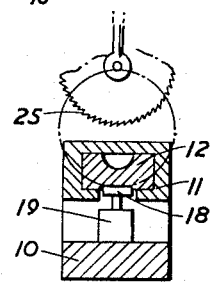
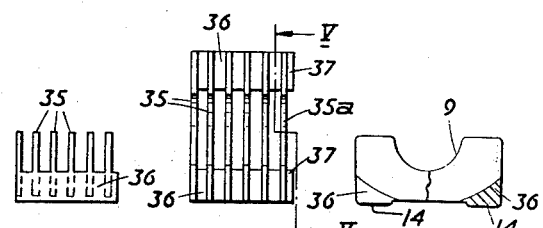
FIG. 2.   FIG. 3.   FIG. 4.   FIG. 5.
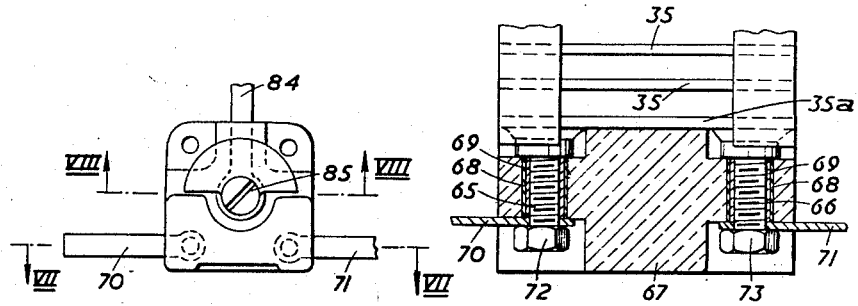
FIG. 6.   FIG. 7.
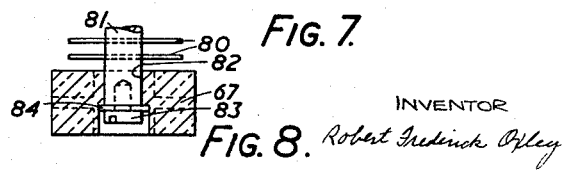
FIG. 8.
INVENTOR
Robert Frederick Oxley
BY
Watson, Cole, Grindle-Watson
ATTORNEYS United States Patent Office 3,129,364
Patented Apr. 14, 1964

3,129,364
ADJUSTABLE ROTARY CONDENSERS
Robert Frederick Oxley, Priory Park, Ulverston, England
Filed Feb. 20, 1961, Ser. No. 90,419
Claims priority, application Great Britain Oct. 28, 1960
1 Claim. (Cl. 317—253)

This invention relates to adjustable rotary, variable capacity, air dielectric condensers and is particularly, though not exclusively, applicable to miniature air-dielectric trimmer condensers.

The normal method of manufacturing sets of condenser plates for condensers of this kind is to stamp out the individual plates from sheet metal and to assemble these together, parallel to one another, by soldering the plates on to longitudinal connecting elements.

Such sets of condenser plates have to be secured to a part of the apparatus in which they are incorporated and have to be insulated therefrom. The normal arrangement is to have a frame-work from which both the rotor and the stator are supported. The method of supporting the stator from the framework is generally complicated and has to incorporate some form of insulator since the framework is usually of a conductive material. Such means of support often comprise longitudinal members extending perpendicularly to the planes of the stator plates and secured to their edges, and insulating pillars joined to the longitudinal members of the framework. The pillars are of insulating material and for this reason cannot be simply soldered to the longitudinal members and the framework but have to be attached to each in a relatively complicated manner. These pillars extend in directions parallel with the planes of the plates of the stator and so extend outside the areas bounded by the peripheries of the plates.

Condensers constructed in this manner are complicated and expensive but a greater disadvantage is that they occupy very much more room than the amount of space occupied by the condenser electrodes themselves. It is highly desirable, in view of present tendencies towards miniaturization to dispense with wasted space and for a condenser to occupy very little more room than the useful space occipied by the condenser plates themselves.

Accordingly it is an object of the invention to provide condensers of simple and cheap construction which can be made to occupy very little room.

According to the present invention a stator assembly for an adjustable variable-capacity air-dielectric condenser comprises a stator and a thin base member of insulating material, the stator consisting of generally congruent parallel plates arranged side-by-side and joined to one another over part of their edges and of integral construction formed by cutting parallel slots in a solid metal bar, and the stator being secured to the base member by elongate projections which extend away from one end plate of the stator and are secured in apertures in the base member.

Stators of integral construction and formed by cutting slots in a metal bar are far stronger than stators made up from individual plates and are sufficiently strong to be supported directly from their ends without the necessity for the complicated framework and supporting means previously found necessary.

In order to further strengthen the arrangement, the end plate adjacent the insulating base may be thicker than the other parallel plates of the stator.

The projections may be constituted by ribs which extend perpendicularly to the plates and serve to connect the plates together. In another arrangement, the projections are constituted by a plurality of studs while in yet another arrangement, the projections are constituted by the legs of a metal staple, the connecting piece of which is secured, to the end plate.

Further objects and advantages of the invention will become apparent from the following description of several forms of the invention which have been illustrated in detail in the accompanying drawings.

In the drawings:

FIG. 1 is a somewhat diagrammatic front elevation of an automatic sawing machine designed to manufacture integral stator electrodes from a solid extruded bar;

FIG. 2 is a fragmentary sectional end view on the lines II—II in FIGURE 1;

FIG. 3 is a front elevation of a completed integral stator electrode unit as manufactured by the machine illustrated in FIG. 1;

FIG. 4 is a plan view of the electrode unit of FIG. 3;

FIG. 5 is an end view of the electrode unit partly in section on the lines V—V in FIG. 4;

FIG. 6 is a plan view of a variable capacity air dielectric condenser including a stator electrode unit as illustrated in FIGS. 3, 4 and 5;

FIG. 7 is a sectional view on an enlarged scale on the line VII—VII of FIG. 6;

FIG. 8 is a sectional view on an enlarged scale on the line VIII—VIII in FIG. 6;

Figure 9:
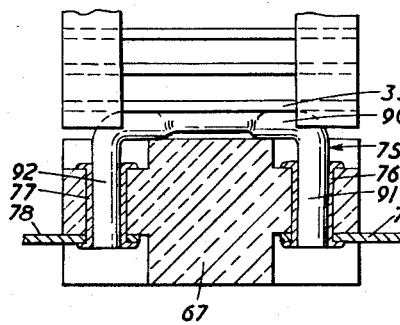
FIG. 9 is a sectional view similar to FIG. 7 of an alternative anchorage for a stator electrode unit.

The machine illustrated in FIGURES 1 and 2 comprises a base 10 having a hollow horizontal guide 11 in which can slide a solid extruded brass bar 12 of generally rectangular cross section. As shown more clearly in FIGURE 5, this bar has a semi-cylindrical groove 9 formed in its upper face designed to allow the necessary spacing from the spindle of the complementary rotor electrode, and a pair of shallow longitudinal ribs 14 formed at the edges of the lower face. This bar 12 is fed automatically into the machine by means of a thrust plate 15 connected to a weight 16, the position of the bar being determined by an adjustable stop 17 connected to the base 10 of the machine. The base of the machine also supports a solenoid operated braking pad 18 which bears upwardly on the under side of the bar 12, the solenoid 19 being connected to electric terminal leads which include contacts 20 which are operated automatically by a cam 21 on a camshaft 22.

The machine also includes a set of rotary ganged saws which in the present example comprises six smaller diameter saws 25 and one larger diameter saw 26 located at the end of the saw assembly adjacent to the stop 17. The diameter of the saws 25 is slightly greater than the diameter of the rotary electrode which is to co-operate with the final stator electrode unit. The saws 25, 26 are driven by an electric motor 27 and are mounted on a sliding frame 28 which is accurately supported in guides 29, 30 and is under the control of a cam 31 mounted on a shaft 32 which is geared to the camshaft 22.

In operation of the machine the rotation of the camshaft 22 and of the shaft 32 causes the braking pad 18 to be engaged, and the rotary saw assembly to be depressed against the free end of the extruded bar 12, and thus to form a series of generally semi-circular saw cuts in the bar, the lower surfaces of these saw cuts being as illustrated in FIGURE 5. At the same time the larger diameter saw 26 parts off the end of the extruded bar which has previously been sawn and the previously sawn section of the bar then falls through as a completed stator electrode unit. Further rotation of the shafts 22, 32 then allows the saw assembly to lift clear of the extruded bar 12 and subsequently the contacts 20 are open to deenergise the solenoid 19 and when the braking pad 18 is released from the bar, the bar is moved forwards towards the stop 17 under the influence of the weight 16. The cycle is then repeated.

The limit of the downward movement of the saw assembly as determined by the cam 31 is such that in this position the lower edges of the saws cut through the lower face of the extruded bar between the two longitudinal ribs 14. The completed stator electrode unit as illustrated in FIGURES 3, 4 and 5 thus comprises six parallel condenser plates 35 connected to one another by integral connecting bars 36 extending along the opposite lower edges of the unit and having small projecting lugs 37 at one face of the unit.

The integral slotted stator electrode unit illustrated in FIGS. 3, 4 and 5 is designed to be mounted on a thin insulating base adjacent one end plate of the unit and the anchorage of this unit to the base may take various forms. In the construction illustrated in FIGURES 6, 7 and 8 the electrode plate at one end of the electrode, which is designated in the drawings by the reference 35a, has rigidly connected thereto, for example by welding, two small screwthreaded bolts 65, 66. The electrode is mounted on a thin base member 67 of insulating material, for example a ceramic. The base 67 has two small holes formed therein at two adjacent corners and the interior surfaces of these holes are coated with a silver deposit 68. The screwthreaded bolts 65, 66 are inserted through these holes and the bolts are then soft soldered into position, the solder 69 forming a joint between the respective bolt and the silver deposit 68. Electrical terminal leads 70, 71 are then secured to the free ends of the bolts by lock nuts 72, 73. The condenser also includes a rotor comprising a number of parallel plates 80 which are secured to a shaft 81. Preferably the stator is of integral construction and is cut from a solid metal bar of suitable cross-section in a machine similar to that shown in FIGURES 1 and 2. The shaft 81 extends through a central hole 82 in the ceramic base and is secured therein by means of a screw 83 which extends into a threaded hole formed in the extremity of the shaft 81. The screw 83 also secures an electrical terminal lead 84 to the end of the shaft 81. The shaft 81 is a fairly tight fit in the hole 82 and the rotor can be rotated by means of a suitable tool entered into a slot 85 formed in the end of the shaft 81 remote from that secured in the base 67 but will remain in any position to which it is rotated.

Figure 10:
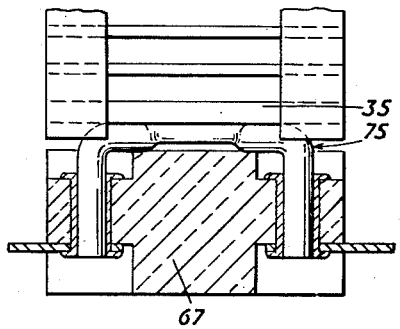
FIG. 10 is a view similar to FIG. 9 of a stator electrode unit having an end plate which is thicker than the other plates of the unit.

In the alternative construction illustrated in FIGURE 9, a U-shaped wire staple 75 is secured by brazing or welding its connecting portion 90 to the end plate 35a of the stator electrode. A pair of metal eyelets 76, 77 are positioned within holes formed in the insulating base member 67 and receive the legs 91, 92 of the staple 75. The eyelets also serve to retain the ends of electric terminals 78, 79. The embodiment illustrated in FIGURE 10 is identical with that illustrated in FIGURE 9 with the exception that the end plate 35b to which the staple 75 is secured is of substantially greater thickness than the remaniing plates of the stator electrode unit giving greater strength at the point of support.

Figure 12:
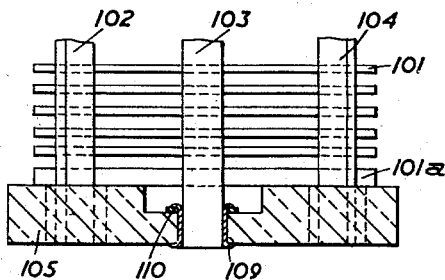
FIG. 12 is a partial elevation partly in section on the line XII—XII in FIG. 11.
Figure 11:
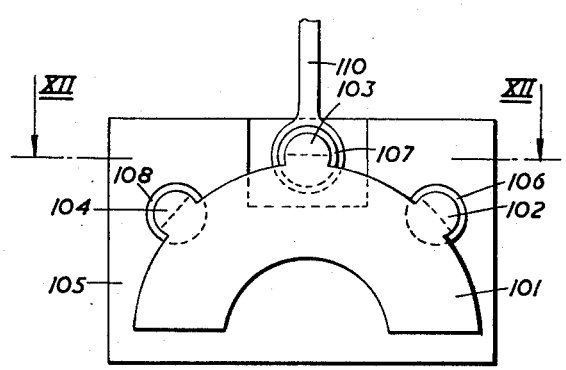
FIG. 11 is a plan view of a stator electrode unit of alternative form mounted on an insulating base.

In the arrangement illustrated in FIGURES 11 and 12, the stator electrode unit comprises a number of parallel electrode plates 101 which are joined by three ribs 102, 103 and 104. The plates and the ribs are integral with one another and are manufactured from a solid bar of suitable cross-section in a machine similar to that shown in FIGURES 1 and 2. One end plate of the electrode unit designated by 101a is thicker than the remaining plates and rests on a thin insulating base member 105 of ceramic material. The ribs 102, 103, 104 extend beyond the plate 101a and enter holes 106, 107, 108 in a thin insulating base 105. The holes 106 and 108 are coated with a silver deposit and the ribs are soft soldered into position with the solder forming a joint between the respective rib and the silver deposit. The hole 107 is provided with an eyelet 109 into which the end of the rib 103 is fitted. The eyelet 109 also retains the end of an electrical terminal 110.

It will be seen that the invention provides an arrangement which is, because of the simplicity of the connection between the stator and the insulating base member and because of the absence of the framework used in prior embodiments, very much simpler than previous arrangements which have been adopted. Moreover, by mounting the condenser on its end and by avoiding the use of framework to support the stator, very much less "floor space" is occupied by the condenser than has previously been possible as will be clearly seen from FIGURE 6.

The invention provides a condenser in which the axis of the rotor is perpendicular to the plane of the base on which the condenser is mounted, an arrangement which has previously only been possible by means of a framework surrounding the condenser. Such an arrangement is obviously desirable since other components can be positioned close alongside the condenser without obstructing the end of the rotor, thus enabling adjustments to the capacity of the condenser to be easily made.

What I claim as my invention and desire to secure by Letters Patent is:

A stator assembly for an adjustable variable-capacity air-dielectric condenser comprising a stator consisting of two end plates and at least one intermediate plate, the said plates each having a generally rectangular boundary consisting of two long edges and two short edges, the said plates being parallel, arranged side-by-side in spaced relationship, connecting ribs extending between and joining relatively adjacent plates at the corners of the respective plates lying at opposite ends of one of said long edges, the stator being of integral homogenous metal construction comprising a solid metal bar of generally rectangular cross-section having a plurality of parallel slots therein extending transversely to said ribs to define said spaced plates, a thin generally rectangular base member of insulating material adjacent one of the said end plates and having one edge equal in length to each of said long edges of said plates and lying in a common plane with the said long edges extending between said ribs, said base member having a pair of apertures therethrough each inwardly spaced from a corner at one end of said one edge of said base member, a rotor including relatively spaced parallel plates, a shaft rotatably journalled in said base member and supporting said rotor plates for rotary movement between and parallel to the respective stator plates, said rotor plates having marginal arcuate edges concentric to said shaft, and a pair of studs fixedly secured to said one end plate on the side of said one end plate remote from the other of said end plates and extending perpendicularly to the plane in which said one end plate lies, said studs being inwardly spaced from the periphery of said one end plate, and said studs being secured in said apertures.

References Cited in the file of this patent

UNITED STATES PATENTS

| | | |
|---|---|---|
| 1,155,448 | Seibt | Oct. 5, 1915 |
| 1,629,020 | Craft | May 17, 1927 |
| 1,654,881 | Isler | Jan. 3, 1928 |